United States Patent
Wu

(10) Patent No.: US 10,360,841 B2
(45) Date of Patent: Jul. 23, 2019

(54) DISPLAY DEVICE INCLUDING A CIRCUITRY OF MULTIPLE VBO INPUT

(71) Applicant: Shenzhen China Star Optoelectronics Technology Co., Ltd., Shenzhen, Guangdong (CN)

(72) Inventor: Yu Wu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 496 days.

(21) Appl. No.: 15/303,789

(22) PCT Filed: Jul. 20, 2016

(86) PCT No.: PCT/CN2016/090572
§ 371 (c)(1),
(2) Date: Oct. 13, 2016

(87) PCT Pub. No.: WO2018/000474
PCT Pub. Date: Jan. 4, 2018

(65) Prior Publication Data
US 2018/0182282 A1 Jun. 28, 2018

(30) Foreign Application Priority Data
Jun. 30, 2016 (CN) .......................... 2016 1 0513808

(51) Int. Cl.
G09G 3/20 (2006.01)
H04J 1/00 (2006.01)

(52) U.S. Cl.
CPC ............. *G09G 3/2096* (2013.01); *G09G 3/20* (2013.01); *G09G 2310/08* (2013.01); *G09G 2370/08* (2013.01); *G09G 2370/20* (2013.01); *H04J 1/00* (2013.01)

(58) Field of Classification Search
CPC ....................................................... G09G 3/02
See application file for complete search history.

(56) References Cited

U.S. PATENT DOCUMENTS

| | | | | |
|---|---|---|---|---|
| 7,135,884 B1* | 11/2006 | Talbot | ................... | H03K 17/164 326/30 |
| 7,439,760 B2* | 10/2008 | Nguyen | .............. | H04L 25/0278 326/30 |
| 2002/0113767 A1* | 8/2002 | Lin | ....................... | G09G 3/2011 345/98 |
| 2007/0274563 A1* | 11/2007 | Jung | ................... | H04N 1/00352 382/103 |

* cited by examiner

*Primary Examiner* — Joseph R Haley
(74) *Attorney, Agent, or Firm* — Andrew C. Cheng

(57) ABSTRACT

Providing a display device including a circuitry of multiple VBO inputs, which comprises: a circuit board includes a VBO output; a controlling board includes a plurality of VBO inputs; a plurality of first switches, each includes a controlling port interconnected to one of the VBO inputs of the controlling panel through a first resistor, each switch further includes a first connecting port connected to a power source through a second resistor, and a second connecting port is connected to a ground; and a second switch, includes a controlling port interconnected to each first connecting port of the plurality of first switches through a third resistor, and a first connecting port of the second switch connected to a power source through a forth resistor and to the VBO input of the circuit board, and a second connecting port is connected to a ground.

10 Claims, 2 Drawing Sheets

DISPLAY DEVICE INCLUDING A CIRCUITRY OF MULTIPLE VBO INPUT

BACKGROUND OF THE INVENTION

1. Field of the Invention

The present invention relates to a technology of liquid crystal display, and more particularly, to a display device including a circuitry of multiple V-By-One (VBO) inputs.

2. Description of Prior Art

In recent years, with the increased requirements of high definition screen of display devices, requirements of a signal transmission interface of display devices is also to be increased. Thus, V-By-One (VBO) becomes a standard signal transmission interface suitable flat panel displays, and with advantage in high transmission quality, high transmission speed, reducing cost, reducing installation space and so on. It is widely used in display devices, multifunction printers, office equipment, car entertainment equipment, robots, security systems and other fields. Especially in ultra-high-definition (UD) display devices, a VBO is generally used in interface between in a circuit board and a controlling board (e.g., a Timing-Control board).

VBO signal is a high-frequency differential signal, it does not have any individual clock signals, but transmits clock signals and data signals in different time respectively, and has a specific transmission mechanism. In the VBO transmission mechanism, first of all, a VBO output (e.g. a circuit board) can send the clock signals according to a fixed frequency to a VBO input (e.g. a controlling board.) Then, when a transmission frequency of data transmission from the VBO output is locked by the VBO input, the VBO input can send a lockup signal to the VBO output to inform the transmission frequency of data transmission has been locked, and the VBO output can transmit data signals according to the fixed frequency to the VBO input, so the VBO input can receive and grab data according to the fixed frequency. Here below, the clock signal can be a clock data recovery (CDR) training pattern.

FIG. 1 is an illustrative view of circuitry of multiple VBO inputs of a conventional display device. As shown in FIG. 1, a plurality of VBO inputs LOCK_RX1, LOCK_RX2, ... , LOCK_RXn of the controlling board are connected to the VBO output LOCK_TX of the circuit board through resistors, respectively. The VBO output LOCK_TX of the circuit board is connected to a power source VDD through a resistor.

When the power source (e.g., 3.3V) powered on, the lockup signal sent from the plurality of VBO inputs LOCK_RX1, LOCK_RX2 are treated as high frequency signals. When the lockup signals are high frequency signals, it indicates that the controlling board does not lockup the transmission frequency for data transmission. When the VBO output LOCK_TX of the circuit board received the high frequency signals, the VBO output LOCK_TX of the circuit board send then clock signals (e.g., CDR training pattern) to the plurality of VBO inputs LOCK_RX1, LOCK_RX2, ... , LOCK_RXn of the controlling board. When the plurality of VBO inputs LOCK_RX1, LOCK_RX2, ... , LOCK_RXn of the controlling board locked the transmission frequency for data transmission according to the clock signals, the plurality of VBO inputs LOCK_RX1, LOCK_RX2, ... , LOCK_RXn of the controlling board reduce the frequency of the lockup signal (i.e., send a low frequency signal.) The lockup signal is a low frequency signal; it indicates that the controlling board has locked the transmission frequency for data transmission. When the VBO output LOCK_TX of the circuit board received the low frequency signals, the VBO output LOCK_TX of the circuit board sends data signals to the plurality of VBO inputs LOCK_RX1, LOCK_RX2, ... , LOCK_RXn of the controlling board. If the controlling board lost the transmission frequency for data transmission, the plurality of VBO inputs LOCK_RX1, LOCK_RX2, ... , LOCK_RXn of the controlling board can increase the lockup signal again, then the VBO output LOCK_TX of the circuit board can send the clock signals again.

The circuitry as shown in FIG. 1, Because the plurality of VBO inputs LOCK_RX1, LOCK_RX2, ... , LOCK_RXn of the controlling board and the VBO output LOCK_TX of the circuit board are a short circuit to receive the clock signals and data signals from the VBO output LOCK_TX of the circuit board, therefore, if one of the VBO input lost the transmission frequency for data transmission, the high frequency lockup signal will be reduced by low frequency lockup signals sent from other VBO inputs. So the VBO output LOCK_TX of the circuit board cannot resend the clock signals, the VBO inputs which is lost the transmission frequency still receive data according to wrong frequency. In addition, when the power source powered on, the frequencies locked by the plurality of VBO inputs LOCK_RX1, LOCK_RX2, ... , LOCK_RXn of the controlling board are not synchronized, it will also find the similar errors.

SUMMARY OF THE DISCLOSURE

In order to solve deficiencies of prior art, the present invention provides a display device including a circuitry of multiple VBO inputs. This display device can ensure the accuracy of the data transmission either when a single error occurred in the one of a plurality of VBO inputs, or the lockup frequencies of the plurality of VBO inputs of the controlling board are unsynchronized.

According to the present invention, on one hand, providing a display device including a circuitry of multiple VBO inputs, which comprises: a circuit board includes a VBO output, sending clock signals and data signals to a controlling panel through the VBO output; the controlling board includes a plurality of VBO inputs to receive clock signals and data signals from the VBO outputs of the circuit board; a plurality of first switches, each includes a controlling port interconnected to one of the VBO inputs of the controlling panel through a first resistor, each first switch further includes a first connecting port connected to a power source through a second resistor, and a second connecting port is connected to a ground; and a second switch, includes a controlling port interconnected to each first connecting port of the plurality of first switches through a third resistor, and a first connecting port of the second switch connected to a power source through a forth resistor and to the VBO input of the circuit board, and a second connecting port is connected to a ground.

Alternatively, when any one of the controlling port of the first switches received high frequency signals from the VBO input, the one of the first switches is turned on; and when any one of the controlling port of the first switches received low frequency signals from the VBO input, the one of the first switches is turned off.

Alternatively, when the controlling port of the second switch received high frequency signals from each first connecting port of the first switches of the plurality of first switches, the second switch is turned on; and when the controlling port of the second switch received low frequency signals from each first connecting port of the first switches of the plurality of first switches, the second switch is turned off.

Alternatively, the first and second switches are n-type metal oxide semiconductor (NMOS) transistors. The controlling port of the first and second switches are gates, the first connecting port of the first and second switches are drain, and the second connecting port of the first and second switches are sources.

Alternatively, transmission frequencies of the data signals received from the circuit board can be locked by the control board base on the clock signals received from the circuit board.

Alternatively, when a transmission frequency for the data signals from any one of the VBO input of the circuit board is not locked, the one of the VBO input sends high frequency signals to the controlling port of the first switch interconnected to itself.

Alternatively, when a transmission frequency for the data signals from any one of the VBO input of the circuit board has been locked, the one of the VBO input sends low frequency signals to the controlling port of the first switch interconnected to itself.

Alternatively, when the VBO output of the circuit board received high frequency signals from the first connecting port of the second switch, the VBO output of the circuit board sends clock signals to a plurality of VBO inputs of the control board.

Alternatively, when the VBO output of the circuit board received low frequency signals from the first connecting port of the second switch, the VBO output of the circuit board sends data signals to the plurality of VBO inputs of the control board.

Alternatively, each first connecting port of the first switches of the plurality of first switches is connected to the power source through a resistor, so the plurality of VBO inputs of the control board sends high frequency signals through the power source.

The display device including a circuitry of multiple VBO inputs according to the embodiment of the present invention, the display device can ensure the accuracy of the data transmission either when a single error occurred in the one of a plurality of VBO inputs, or the lockup frequencies of the plurality of VBO inputs of the controlling board are unsynchronized.

The other aspect and/or advantages of the present invention will be described here below. Other aspect and advantages are obvious, and can be readily understood through the preferred embodiment of the present invention.

BRIEF DESCRIPTION OF THE DRAWINGS

Technical implementation will be described below clearly and fully by combining with drawings made in accordance with an embodiment in the present invention.

DETAILED DESCRIPTION OF PREFERRED EMBODIMENTS

Technical implementation will be described below clearly and fully by combining with drawings made in accordance with an embodiment in the present invention. Wherein numeral reference through different drawings represents the same element. Preferred embodiments of the present invention will be detailedly described here below.

Figure 1:
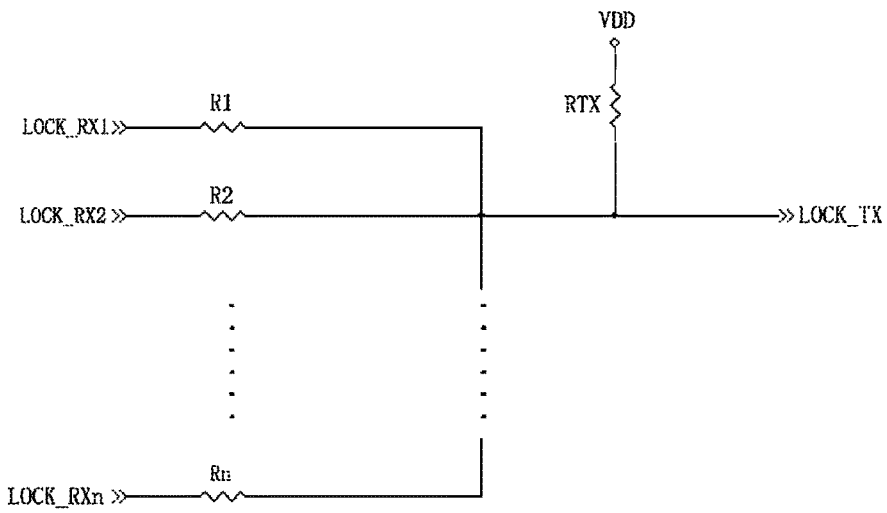
FIG. 1 is an illustrational view of circuitry of multiple VBO inputs of a conventional display device.
Figure 2:
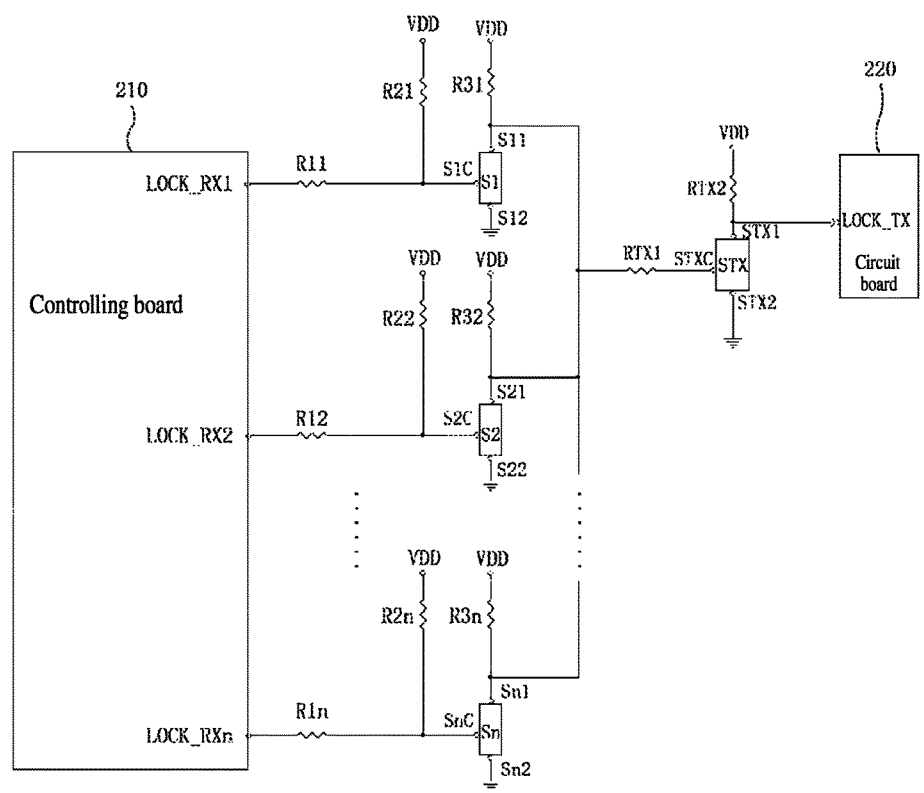
FIG. 2 is an illustrational view of circuitry including multiple VBO inputs in accordance to the embodiment of the present invention.

FIG. 2 is an illustrational view of circuitry including multiple VBO inputs in accordance to the embodiment of the present invention.

Referring to FIG. 2, The display device with a circuitry of multiple VBO inputs in accordance to the embodiment of the present invention, which comprises a controlling board 210, a circuit board 220, a plurality of first switches S1, S2, . . . , Sn and a second switch STX.

The controlling board 210 includes a plurality of VBO inputs LOCK_RX1, LOCK_RX2, . . . , LOCK_RXn. The circuit board 220 includes a VBO output LOCK_TX. The circuit board 220 sends clock signals and data signals to the plurality of VBO inputs LOCK_RX1, LOCK_RX2, . . . , LOCK_RXn through the VBO output LOCK_TX. The controlling board 210 receives clock signals and data signals from the VBO output LOCK_TX through the plurality of VBO inputs LOCK_RX1, LOCK_RX2, . . . , LOCK_RXn.

The VBO output LOCK_TX of the circuit board 220 can send the clock signals according to a fixed frequency to the VBO input LOCK_RX1, LOCK_RX2, . . . , LOCK_RXn of the controlling board 210. Transmission frequencies of the data signals received from the VBO output LOCK_TX of the circuit board 220 can be locked by the VBO input LOCK_RX1, LOCK_RX2, . . . , LOCK_RXn of the controlling board 210 base on the clock signals received from the VBO output LOCK_TX of the circuit board 220. Here below, the clock signal can be a CDR training pattern.

According to the embodiment in the present invention, the CDR training pattern can be a kind of the 01010101 . . . signals, i.e., the VBO output LOCK_TX of the circuit board 220 can send the 01010101 . . . signals according to a fixed frequency to the VBO input LOCK_RX1, LOCK_RX2, . . . , LOCK_RXn of the controlling board 210. When the VBO input LOCK_RX1, LOCK_RX2, . . . , LOCK_RXn of the controlling board 210 received the 01010101 . . . signals, the VBO input LOCK_RX1, LOCK_RX2, . . . , LOCK_RXn of the controlling board 210 can detect the switching frequency of 0 and 1, so as to lock the transmission frequency.

When the VBO input LOCK_RX1, LOCK_RX2, . . . , LOCK_RXn of the controlling board 210 sent the lockup signal to the VBO output LOCK_TX of the circuit board 220 to inform the transmission frequency for the data transmission has been locked. The VBO output LOCK_TX of the circuit board 220 can send data signals according to the transmission frequency to the VBO input LOCK_RX1, LOCK_RX2, . . . , LOCK_RXn of the controlling board 210, so the VBO input LOCK_RX1, LOCK_RX2, . . . , LOCK_RXn of the controlling board 210 can receive and grab data according to the transmission frequency.

The plurality of first switches S1, S2, . . . , Sn, each includes a controlling port, a first connecting port and a second connecting port. Wherein when the first connecting port is interconnected to the second connecting port, it indicates that the first switch is turned on, and when the first connecting port is not interconnected to the second connecting port, it indicates that the first switch is turned off. Each controlling port of the first switch is interconnected to one of the VBO inputs of the controlling panel 210 through a first resistor. Each first connecting port of the first switch is connected to a power source VDD through a second resistor, and Each second connecting port of the first switch is connected to a ground.

According to the embodiment, the first switch S1 includes a controlling port S1C, a first connecting port S11 and a second connecting port S21. Wherein the controlling port S1C of the first switch S1 is interconnected to the VBO inputs LOCK_RX1 of the controlling panel 210 through a resistor R11. The first connecting port S11 of the first switch S1 is connected to a power source VDD through a resistor R31, and the second connecting port S21 of the first switch S1 is connected to a ground. The first switch S2 includes a controlling port S2C, a first connecting port S21 and a second connecting port S22. Wherein the controlling port S2C of the first switch S2 is interconnected to the VBO inputs LOCK_RX2 of the controlling panel 210 through a resistor R12. The first connecting port S21 of the first switch S2 is connected to a power source VDD through a resistor R32, and the second connecting port S22 of the first switch S2 is connected to a ground. The first switch Sn includes a controlling port SnC, a first connecting port Sn1 and a second connecting port Sn2. Wherein the controlling port SnC of the first switch Sn is interconnected to the VBO inputs LOCK_RXn of the controlling panel 210 through a resistor R1n. The first connecting port S2n of the first switch Sn is connected to a power source VDD through a resistor R3n, and the second connecting port S2n of the first switch Sn is connected to a ground.

According to the embodiment, when any one of the controlling port of the first switches S1, S2, . . . , Sn received high frequency signals from the VBO input interconnected to itself, the one of the first switches is turned on. For example, when the controlling port S1C of the first switch S1 received high frequency signals from the VBO input LOCK_RX1, the first switch S1 is turned on. When the controlling port S2C of the first switch S2 received high frequency signals from the VBO input LOCK_RX2, the first switch S2 is turned on. When the controlling port SnC of the first switch Sn received high frequency signals from the VBO input LOCK_RXn, the first switch Sn is turned on.

According to the embodiment, when any one of the controlling port of the first switches S1, S2, . . . , Sn received low frequency signals from the VBO input interconnected to itself, the one of the first switches is turned off. For example, when the controlling port S1C of the first switch S1 received low frequency signals from the VBO input LOCK_RX1, the first switch S1 is turned off. When the controlling port S2C of the first switch S2 received low frequency signals from the VBO input LOCK_RX2, the first switch S2 is turned off. When the controlling port S2C of the first switch S2 received low frequency signals from the VBO input LOCK_RX2, the first switch S2 is turned off.

The second switch STX includes a controlling port STXC, a first connecting port STX1 and a second connecting port STX2. Wherein, when the first connecting port STX1 is interconnected to the second connecting port STX2, it indicates that the second switch STX is turned on, and the first connecting port STX1 is not interconnected to the second connecting port STX2, it indicates that the second switch STX is turned off. The first connecting port STX1 of the second switch STX is connected to the power source VDD through a resistor RTX2, and the first connecting port STX1 of the second switch STX is connected to the VBO output LOCK_TX of the circuit board 220, the second connecting port STX2 of the second switch STX is connected to a ground.

According to the embodiment, when the controlling port STXC of the second switch STX received high frequency signals from each first connecting port of the first switches of the plurality of first switches S1, S2, . . . , Sn, the second switch STX is turned on.

According to the embodiment, when the controlling port STXC of the second switch STX received low frequency signals from each first connecting port of the first switches of the plurality of first switches S1, S2, . . . , Sn, the second switch STX is turned off.

According to the embodiment, when transmission frequencies of the data signals from any one of the VBO input of the circuit board 210 is not locked, the one of the VBO input sends high frequency signals treated as lockup signals to the controlling port of the first switch interconnected to itself. Wherein the lockup signal is a high frequency signal, it indicates that the transmission frequency for the data signals does not have been locked. Here below, the transmission frequency for the data signals does not have been locked, may include at least one case below, the VBO inputs of the controlling panel 210 does not determine the transmission frequency for the data signals, the VBO inputs of the controlling panel 210 lost the transmission frequency for the data signals, and transmission frequencies locked by the VBO inputs of the controlling panel 210 are not synchronized.

For example, when a transmission frequency for the data signals from the VBO input LOCK_RX1 is not locked, the VBO input LOCK_RX1 sends high frequency signals treated as lockup signals to the controlling port S1C of the first switch S1. When a transmission frequency for the data signals from the VBO input LOCK_RX2 is not locked, the VBO input LOCK_RX2 sends high frequency signals treated as lockup signals to the controlling port S2C of the first switch S2. When a transmission frequency for the data signals from the VBO input LOCK_RXn is not locked, the VBO input LOCK_RXn sends high frequency signals treated as lockup signals to the controlling port SnC of the first switch Sn.

According to the embodiment, the VBO inputs of the controlling panel 210 send high frequency signals to the controlling port of the first switch interconnected to itself, can be achieved in the following descriptions: each first connecting port of the first switches of the plurality of first switches S1, S2, . . . , Sn is connected to the power source VDD through a resistor, so the plurality of VBO inputs LOCK_RX1, LOCK_RX2, . . . , LOCK_RXn of the control board send high frequency signals through the power source VDD, i.e., when the power source VDD powered on, the lockup signal sent from the plurality of VBO inputs LOCK_RX1, LOCK_RX2 are treated as high frequency signals.

According to the embodiment, when a transmission frequency for the data signals from any one of the VBO input of the circuit board 210 has been locked, the one of the VBO input may reduce the frequency of the lockup signal, i.e., the one of the VBO input send low frequency signals treated as lockup signals to the controlling port of the first switch interconnected to itself. Wherein the lockup signal is a low frequency signal, it indicates that the transmission frequency for the data signals has been locked.

For example, when a transmission frequency for the data signals from the VBO input LOCK_RX1 has been locked, the VBO input LOCK_RX1 sends low frequency signals treated as lockup signals to the controlling port S1C of the first switch S1. When a transmission frequency for the data signals from the VBO input LOCK_RX2 has been locked, the VBO input LOCK_RX2 sends low frequency signals treated as lockup signals to the controlling port S2C of the first switch S2. When a transmission frequency for the data signals from the VBO input LOCK_RXn has been locked, the VBO input LOCK_RXn sends low frequency signals treated as lockup signals to the controlling port SnC of the first switch Sn.

According to the embodiment, when the VBO output LOCK_TX of the circuit board 220 received high frequency signals from the first connecting port STX1 of the second switch STX, the VBO output LOCK_TX of the circuit board 220 sends clock signals to a plurality of VBO inputs LOCK_RX1, LOCK_RX2, . . . , LOCK_RXn of the control board 210.

According to the embodiment, when the VBO output LOCK_TX of the circuit board 220 received low frequency signals from the first connecting port STX1 of the second switch STX, the VBO output LOCK_TX of the circuit board 220 sends data signals to a plurality of VBO inputs LOCK_RX1, LOCK_RX2, . . . , LOCK_RXn of the control board 210.

According to FIG. 2, the illustrational view of circuitry including multiple VBO inputs in accordance to the embodiment of the present invention. When the transmission frequency for data transmission from the plurality of VBO inputs LOCK_RX1, LOCK_RX2, . . . , LOCK_RXn of the control board 210 is not locked, the plurality of VBO inputs LOCK_RX1, LOCK_RX2, . . . , LOCK_RXn of the control board 210 send high frequency signals treated as lockup signals to the controlling port S1C, S2C, . . . , SnC of the first switches S1, S2, . . . , Sn, respectively. When the controlling port S1C, S2C, . . . , SnC of the first switches S1, S2, . . . , Sn received the high frequency signals, the first switches S1, S2, . . . , Sn are turned on. Then because the second connecting port S12, S22, . . . , Sn2 of the first switch S1, S2, . . . , Sn are connected to a ground, so the first connecting port S11, S21, . . . , Sn1 of the first switch S1, S2, . . . , Sn output low frequency signals, thereby, the controlling port STXC of the second switch STX receives low frequency signals. When the controlling port STXC of the second switch STX received the low frequency signals, the second switch STX is turned off, thereby, the first connecting port STX1 of the second switch STX outputs high frequency signals, so the VBO output LOCK_TX receives the high frequency signals. When the VBO output LOCK_TX of the circuit board 220 received the high frequency signals, it can confirm the transmission frequency for data transmission from the plurality of VBO inputs LOCK_RX1, LOCK_RX2, . . . , LOCK_RXn of the control board 210 is not locked, so as to send clock signals.

When the plurality of VBO inputs LOCK_RX1, LOCK_RX2, . . . , LOCK_RXn of the controlling board 210 locked the transmission frequency for data transmission according to the clock signals, the plurality of VBO inputs LOCK_RX1, LOCK_RX2, . . . , LOCK_RXn of the controlling board 210 reduce the frequency of high frequency signals, i.e., send low frequency signals treated as lockup signals to the controlling port S1C, S2C, . . . , SnC of the first switches S1, S2, . . . , Sn, respectively. When the controlling port S1C, S2C, . . . , SnC of the first switches S1, S2, . . . , Sn received the low frequency signals, the first switches S1, S2, . . . , Sn are turned off, so the first connecting port S11, S21, . . . , Sn1 of the first switch S1, S2, . . . , Sn output high frequency signals, thereby, the controlling port STXC of the second switch STX receives the high frequency signals. When the controlling port STXC of the second switch STX received the high frequency signals, the second switch STX are turned on. Then because the second connecting port STX2 of the second switch STX is connected to a ground, so the first connecting port STX1 of the second switch STX output low frequency signals, thereby, the VBO output LOCK_TX of the circuit board 220 receives the low frequency signals. When the VBO output LOCK_TX of the circuit board 220 received the low frequency signals, it can confirm the transmission frequency for data transmission from the plurality of VBO inputs LOCK_RX1, LOCK_RX2, . . . , LOCK_RXn of the control board 210 has been locked, so as to send data signals.

According to the display device, as long as a VBO input (e.g., LOCK_RX1) sends high frequency signals treated as lockup signals (i.e., as long as transmission frequency for data transmission from a VBO inputs LOCK_RX1 is not locked,) and all signals received from the VBO output LOCK_TX of the circuit board 220 are high frequency signals, then the circuit board 220 will keep on sending clocking signals while not sending data signals. This is because, as long as a VBO input (e.g., LOCK_RX1) sends high frequency signals treated as lockup signals, and a first switch S1 interconnected to the VBO input LOCK_RX1 is turned on, then signals sent from the first connecting port S11 of the first switch S1 interconnected to the VBO input LOCK_RX1 are also to became low frequency signals, and to make the controlling port STXC of the second switch STX receives low frequency signals, then the second switch STX is turned off, so as signals outputted from the first connecting port STX1 of the second switch STX are high frequency signals, i.e., signals received from the VBO output LOCK_TX of the circuit board 220 are high frequency signals. Therefore, only when all VBO inputs LOCK_RX1, LOCK_RX2, . . . , LOCK_RXn send low frequency signals treated as lockup signals (i.e., all VBO inputs LOCK_RX1, LOCK_RX2, . . . , LOCK_RXn have locked the transmission frequency for data transmission,) signals received from the VBO output LOCK_TX of the circuit board 220 are able to be low frequency signals, then the circuit board 220 begins to send data signals. It can resolve to ensure the accuracy of the data transmission either when a single error occurred in the one of a plurality of VBO inputs, or the lockup frequencies of the plurality of VBO inputs of the controlling board are unsynchronized.

Figure 3:
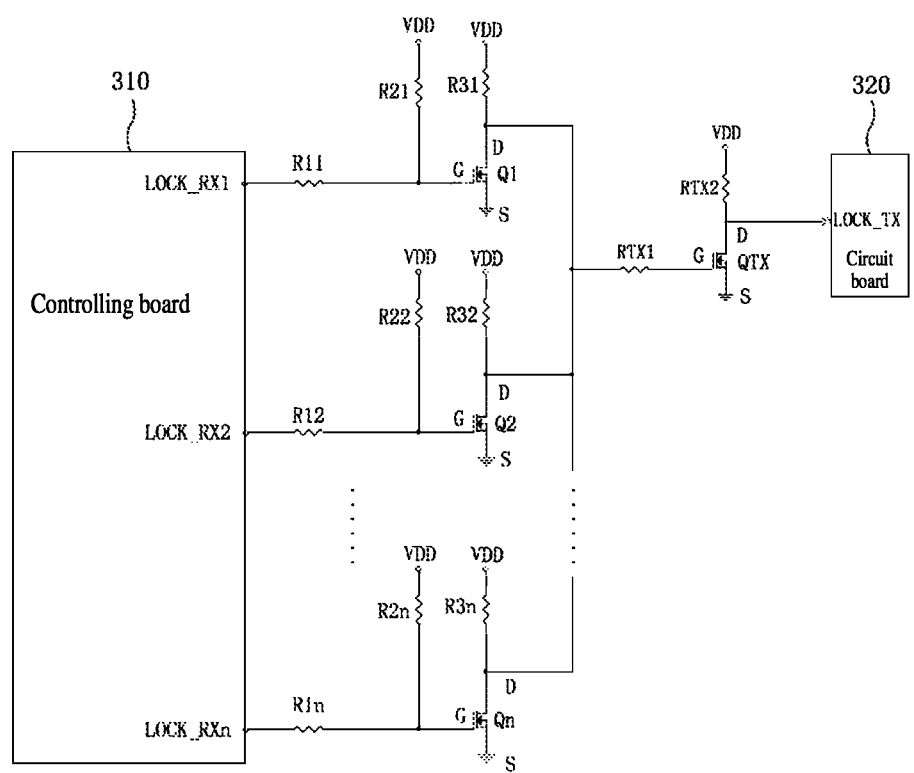
FIG. 3 is an illustrational view of circuitry including multiple VBO inputs in accordance to the other embodiment of the present invention.

FIG. 3 is an illustrational view of circuitry including multiple VBO inputs in accordance to the other embodiment of the present invention.

Referring to FIG. 3, a display device according to the other embodiment of the present invention, comprises a controlling board 310, a plurality of first n-type metal oxide semiconductor (NMOS) transistors Q1, Q2, . . . , Qn, and a NMOS transistor QTX.

The display device of the embodiment can achieve the plurality of first switches S1, S2, . . . , Sn shown in FIG. 2 by a plurality of first NMOS transistors Q1, Q2, . . . , Qn, and can achieve the second switch STX shown in FIG. 2 by a NMOS transistor QTX.

According to the embodiment, gates G of the NMOS transistors Q1, Q2, . . . , Qn are a controlling port of the first switches S1, S2, . . . , Sn, drains D of the NMOS transistors Q1, Q2, . . . , Qn are first connecting ports of the first switches S1, S2, . . . , Sn, and a source S of the NMOS transistors Q1, Q2, . . . , Qn is a second connecting port of the first switches S1, S2, . . . , Sn. A gate G of the NMOS transistor QTX is a controlling port STXC of the second switch STX, a drain D of the NMOS transistor QTX is a first connecting port STX1 of the second switch STX, and a source S of the NMOS transistor QTX is a second connecting port STX2 of the second switch STX.

In addition, the interconnections and implementations of the elements and components of the display device made in accordance with a preferable embodiment shown in FIG. 3 are identical to what disclosed in FIG. 2, therefore no additional description is given here below.

In addition, the first and second switches in the display device according to the embodiment are not only to achieve by NMOS transistor, but also to achieve by bipolar junction transistor (BJT) or other known skills.

The display device including a circuitry of multiple VBO inputs according to the embodiment of the present invention, the display device can ensure the accuracy of the data transmission either when a single error occurred in the one of a plurality of VBO inputs, or the lockup frequencies of the plurality of VBO inputs of the controlling board are unsynchronized.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A display device including a circuitry of multiple V-By-One (VBO) inputs, comprising:
   a circuit board including a VBO output, sending clock signals and data signals to a controlling panel through the VBO output;
   the controlling board including a plurality of VBO inputs to receive clock signals and data signals from the VBO outputs of the circuit board;
   a plurality of first switches, each including a controlling port interconnected to one of the VBO inputs of the controlling panel through a first resistor, each first switch further including a first connecting port connected to a power source through a second resistor, and a second connecting port connected to a ground; and
   a second switch, including a controlling port interconnected to each first connecting port of the plurality of first switches through a third resistor, and a first connecting port of the second switch connected to a power source through a forth resistor and to the VBO input of the circuit board, and a second connecting port connected to a ground.

2. The display device as recited in claim 1, wherein when any one of the controlling port of the first switches received high frequency signals from the VBO input, the one of the first switches is turned on; and
   wherein when any one of the controlling port of the first switches received low frequency signals from the VBO input, the one of the first switches is turned off.

3. The display device as recited in claim 1, wherein when the controlling port of the second switch received high frequency signals from each first connecting port of the first switches of the plurality of first switches, the second switch is turned on; and
   wherein when the controlling port of the second switch received low frequency signals from each first connecting port of the first switches of the plurality of first switches, the second switch is turned off.

4. The display device as recited in claim 1, wherein the first and second switches are n-type metal oxide semiconductor (NMOS) transistors; wherein the controlling port of the first and second switches are gates, the first connecting port of the first and second switches are drain, and the second connecting port of the first and second switches are sources.

5. The display device as recited in claim 1, wherein transmission frequencies of the data signals received from the circuit board are locked by the control board based on the clock signals received from the circuit board.

6. The display device as recited in claim 5, wherein when a transmission frequency from any one of the VBO input of the circuit board is not locked, the one of the VBO input sends high frequency signals to the controlling port of the first switch interconnected to itself.

7. The display device as recited in claim 5, wherein when a transmission frequency from any one of the VBO input of the circuit board has been locked, the one of the VBO input sends low frequency signals to the controlling port of the first switch interconnected to itself.

8. The display device as recited in claim 5, wherein when the VBO output of the circuit board received high frequency signals from the first connecting port of the second switch, the VBO output of the circuit board sends clock signals to a plurality of VBO inputs of the control board.

9. The display device as recited in claim 5, wherein when the VBO output of the circuit board received low frequency signals from the first connecting port of the second switch, the VBO output of the circuit board sends data signals to the plurality of VBO inputs of the control board.

10. The display device as recited in claim 6, wherein each first connecting port of the first switches of the plurality of first switches is connected to the power source through a resistor, so the plurality of VBO inputs of the control board send high frequency signals through the power source.

* * * * *